United States Patent Office 3,362,934
Patented Jan. 9, 1968

3,362,934
PREPARATION OF POLY-(1,4-PHENYLENE ETHERS) BY THERMAL MEANS
Donald A. Bolon, Scotia, N.Y., assignor to General Electric Company, a corporation of New York
No Drawing. Filed May 3, 1966, Ser. No. 547,181
7 Claims. (Cl. 260—47)

This invention relates to the preparation of polyphenylene ethers by heating a 4-phenoxyphenol in the liquid phase to a temperature sufficiently high that the monocyclic phenol corresponding with the terminal phenoxy group of the starting 4-phenoxyphenol is distilled from the reaction mixture.

Polyphenylene ethers, as a class, form an interesting group of new polymers covered by the copending application of A. S. Hay, Ser. No. 212,128, now Patent No. 3,306,874, filed July 20, 1962, as a continuation-in-part of previously filed applications and assigned to the same assignee as the present invention. These polymers were also first described in a publication by Hay and coworkers in J. Amer. Chem. Soc., 81, 6335 (1959) and in more detail in a later series of articles appearing in J. Polymer Science, 58, 581–609 (1962). These are poly-(1,4-phenylene ethers) and are made by an oxidative coupling reaction of various phenols in the presence of an amine-basic cupric salt complex in which the hydrogen of the phenolic group and the hydrogen or halogen on the benzene ring are removed in forming the poly-(1,4-phenylene ethers). The most desirable poly-(1,4-phenylene ethers) are made from 2,6-disubstituted phenols. This is because they are linear polymers joined through the 1 and 4 position, with each unit of the polymer molecule being joined to the adjacent unit through the oxygen of the phenolic hydroxyl group. If the phenols are unsubstituted in either one or both of the 2 and 6 positions, then coupling can also occur at these positions in addition to the 4 position, thereby producing a branch-type of polymer or a cross-linked polymer rather than the linear polymer. Cross-linking and branching of the polymer can be greatly suppressed by using a cyclic amine having large bulky substituents on the carbon atoms adjacent to the amine nitrogen as part of the basic cupric salt complex. However, such amines are not readily available commercially except as high priced laboratory reagents.

I have found unexpectedly that certain phenoxyphenols can be readily polymerized when heated to a temperature sufficiently high that the monocyclic phenol corresponding to the terminal phenoxy group of the starting phenoxyphenol is distilled from the reaction mixture. These phenoxyphenols which can be polymerized by my process have the formula:

I 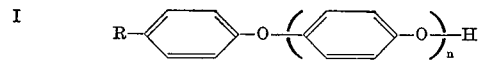

where $n$ is an integer and is at least 1 and not more than 2 and R is a monovalent substituent selected from the group consisting of hydrogen, hydroxyl, methoxy and 4-hydroxyphenoxy. They are polymerized to polyphenylene ethers when heated to a temperature sufficiently high that the monocyclic phenol corresponding to the terminal phenoxy group of the starting 4-phenoxyphenol, i.e., having the formula

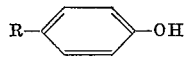

where R is as defined above, is distilled from the reaction mixture.

The phenoxyphenols falling within the scope of the above formula are 4-phenoxyphenol, 4-(4-hydroxyphenoxy)phenol, 4-(4-methoxyphenoxy)phenol, 1,4-bis(4-hydroxyphenoxy)benzene, 1-(4-methoxyphenoxy)-4-(4-hydroxyphenoxy)benzene and 4,4'-bis(4-hydroxyphenoxy)-diphenyl ether, alternatively named bis-4-(4-hydroxyphenoxy)phenyl ether. The first two of these phenoxyphenols are commercially available while the balance may be made from these two phenols or other readily available materials by well known techniques. The methoxy derivatives may be made methylating the corresponding phenol, e.g., with dimethyl sulfate, etc. The other nonmethylated phenols may be made by the Ullmann reaction. For example, the last phenol in the above list may be made from bis-4-bromophenyl ether and the potassium salt of hydroquinone monomethyl ether.

It will be readily apparent that 4-phenoxyphenol is a dimeric oligomer and 4-(4-phenoxyphenoxy)phenol is the trimeric oligomer of poly-(1,4-phenylene ether) and the other phenoxyphenols are hydroxy and methoxy derivatives thereof. In this thermal polymerization reaction, 2 molecules of these dimers or trimers react with each other in a step-wise reaction in which 1 molecule of phenol and 1 molecule of the next higher oligomer are produced, i.e., 2 molecules of the dimer, 4-phenoxyphenol, would produce 1 molecule of phenol and 1 molecule of the trimer, 4-(4-phenoxyphenoxy)phenol. In the next step, 1 molecule of the trimer and 1 molecule of the dimer react to again produce 1 molecule of phenol and 1 molecule of the tetramer. Alternatively, 2 molecules of the trimer can react to produce 1 molecule of the dimer and 1 molecule of the tetramer, in the same way as when the trimer is the starting material. Both of these reactions continue until finally no more phenol can be distilled from the solution. If the heating is carried out in an oxygen-free atmosphere, this reaction appears to be self-limiting when a poly-(1,4-phenylene ether), having an average up to about 20 phenoxy units, is obtained, i.e., $n$ in Formula I is 20.

If the reaction is carried out in air or other oxygen-containing atmosphere, and also if the polymeric product obtained by heating in an oxygen-free atmosphere is heated in oxygen, the polymerization reaction continues, finally producing an insoluble, tough, hard polymer which is no longer fusible. If a thin layer of these materials is heated in the presence of an oxygen-containing gas, the films, which are obtained, are very flexible. They can be made in continuous lengths of films, tapes, etc., having a wide variety of uses.

The temperature used for carrying out this reaction must be high enough that the phenoxyphenol corresponding to the terminal phenoxy group of the starting phenoxyphenol, i.e., has the formula

where R is as defined previously, is distilled from the reaction mixture. Generally, this temperature will be in the range of 250–300° C. if the reaction is carried out in an oxygen-containing atmosphere and will generally be 300–350° C., if carried out in an oxygen-free atmosphere. In either case temperatures up to the reflux temperature of the reaction mixture may be used.

The reaction may be aided by the use of solvents in which the starting phenoxyphenol are soluble and which have a sufficiently high boiling point to permit the obtaining of the desired reaction temperature. The solvents which I have found useful for this process are terphenyl, the various halogenated derivatives of biphenyl and biphenyl ether, especially the chlorinated biphenyls and chlorinated biphenyl ethers, or mixtures thereof. The solvents are readily available commercially and are particularly desirable since, when hot, they are solvents for the polymeric products up to the point where the polymer becomes insoluble in all solvents. The solutions of the polymers in these solvents, when cast into thin layers, readily evaporate at temperatures of 250° C. up to their boiling point to produce smooth cast films of the polymer.

The use of these solvents is necessary when 4-phenoxyphenol itself is used as the starting material if the heating is to be performed in an oxygen-free atmosphere. This material is volatile enough that it will evaporate, when heated in the absence of a solvent, before a temperature high enough to cause phenol to be distilled is attained. By the use of these solvents, the evaporation of this product is suppressed, until a temperature high enough that phenol readily distills from reaction mixture and poly-(1,4-phenylene ether) is produced. The use of these solvents is desirable with the other starting phenoxyphenols corresponding to the above general formula. The solvent also suppresses evaporation of these phenoxyphenols from the reaction mixture, thereby increasing the yield of polymer.

If the maximum yield of polymer is desired, the preferred method is to heat a solution of the phenoxyphenol in a solvent in the absence of oxygen until no more of the phenol is distilled from the solution. At this stage, the polymer has an average of 14–20 phenoxy units in the polymer molecule. This polymer may be isolated by adding a nonsolvent to the reaction mixture or pouring the reaction mixture into a nonsolvent for the polymer. The isolated polymer or the solution of the polymer may thereafter be heated in an oxygen-containing atmosphere, for example, air to a temperature where the polymer is in the liquid state, after any solvent present has evaporated, but below the temperature where charring occurs. If held at such temperature, the solvent will evaporate if it is present and the polymer will gradually solidify and be converted into an insoluble polymer. Because of the insolubility of the polymer, it is not possible to determine the molecular weight of the final product or its actual chemical structure. The insolubility may be due to physical state of the polymer, e.g., molecular symmetry, etc., or to some crosslinking reaction. Films produced by heating in an oxygen-containing atmosphere remain flexible even down to liquid nitrogen temperatures.

In order that those skilled in the art may understand my invention better, the following examples are given by way of illustration but not by way of limitation. In all the examples, percentages are by weight unless otherwise specifically stated. Where analysis is given, the determined value is followed by the theoretical value in parentheses.

GENERAL METHOD

The general method to be used when all of the heating is carried out in an oxygen-containing atmosphere is as follows. The phenoxyphenol is evenly spread over the surface to be coated if it is heated in the absence of a solvent or the phenoxyphenol and solvent are placed in a container in which the bottom is the surface to be coated, surrounded by the retaining sidewalls. The particular phenoxyphenol is heated in an oxygen-containing atmosphere, e.g., air, permitting the volatiles to evaporate. The temperature of the heating is high enough to completely volatilize all of the solvent used but not high enough to char the resulting polymer film. Temperatures just exceeding the melting point of the initial polymer film are satisfactory. At the point when essentially all of the solvent has evaporated, a thin fluid is left which upon further heating becomes more viscous and finally it is converted to a non-flowing solid. At this point, the polymer is tough, flexible and may be removed if the film has deposited on a highly polished, inert surface.

In a series of tests in which the heating was performed in a tube furnace in which the temperature could be accurately controlled and measured, it was determined that the optimum temperature was between 250–300° C. Temperatures greater than 300° C. during the distillation of the phenol, caused an excess of the starting phenoxyphenol to distill, thus reducing the polymer yield. At temperatures below 250° C., the reaction was too slow to be practical.

In another series of tests, run at 275° C., the effect of the atmosphere was determined by using a covered container to contain the starting phenoxyphenol over which a controlled atmosphere was passed at the rate of 1 cubic foot per hour. When pure nitrogen was used, no phenol was distilled from the container. As the amount of oxygen in the nitrogen was increased, the optimum yield of the polymer was obtained in the range of 25–50 volume percent of oxygen. Although the yield keeps increasing above 50 volume percent oxygen, the flexibility of the polymeric product decreases. For optimum flexibility, therefore, the oxygen-containing gas should preferably contain no greater than 50 volume percent oxygen. However, if thicker castings are desired, for example, if the material is to be used as a potting compound where flexibility is not a requirement, then higher amounts of oxygen can be contained in the oxygen containing gas. Air which contains about 20 volume percent of oxygen is satisfactory and will generally be used because of its low cost and negligible effect on yield of polymer.

The general method to be used when the initial heating is carried out in an essentially oxygen-free atmosphere and the final stage being carried out in an oxygen-containing atmosphere is as follows. A distilling flask having a wide-necked delivery arm is provided with a heating element for the vertical column. The phenoxyphenol and solvent are charged into the distilling flask and heated under an atmosphere of nitrogen. The heating element on the delivery arm is maintained at a temperature of 210–220° C. whereas the distillation pot is heated to the reflux temperature of the particular solvent used. Heating is stopped when no more of the phenol distills. The hot solution can be used directly for the casting of films, which are then heated in an oxygen-containing atmosphere, or the polymer may be isolated as previously described.

In the particular examples given here for illustration, trichlorobiphenyl was used as a solvent and the pot heated to the reflux temperature of 330° C.

*Example 1*

This example illustrates the use of an oxygen-containing atmosphere, specifically air, during the entire heating. Using the general procedure, the particular phenoxyphenol and its weight, the yield and analysis of the polymer are given in Table I. The solvent was 5 ml. of trichlorobiphenyl. Heating was carried out at 275° C. and continued until all of the solvent had evaporated and the initial melt obtained was converted to a non-flowing solid. Glass petri dishes open to the air were used as the container. The films were easily stripped from the glass as strong, flexible, tough films which were insoluble in all of the usual solvents.

*Table I*

| Phenoxyphenol (wt.) | Weight of Polymer, g. | Analyses | |
|---|---|---|---|
| | | C | H |
| 4-phenoxyphenol (2.0 g.) | 0.73 | 78.0 (78.2) | 4.4 (4.3) |
| 4-(4-phenoxyphenoxy)-phenol (2.0 g.) | 0.8 | 78.4 (78.2) | 4.5 (4.3) |
| 4-(4-hydroxyphenoxy)-phenol (2.0 g.) | 1.13 | 77.7 (78.2) | 4.3 (4.3) |
| 4-(4-methoxyphenoxy)-phenol (2.0 g.) | .88 | 77.5 (78.2) | 4.3 (4.3) |
| 4,4'-bis(4-hydroxyphenoxy) diphenyl ether (10 g.) | 0.8 | 77.7 (78.2) | 4.3 (4.3) |

*Example 2*

This example illustrates first heating in an essentially oxygen-free atmosphere, recovering of the polymer so produced and thereafter heating in an oxygen-containing atmosphere as described in Example 1. Using the general procedure outlined above in which 10 g. of the particular phenol and 100 ml. of trichlorobiphenyl was used as the solvent, the phenol which distilled from the reaction mixture was collected. Heating was continued for approximately 6 hours by which time no more phenol distilled from the reaction vessel. Further heating beyond this time produced no more phenol nor did the molecular weight of the polymer increase. After cooling to room temperature, the slurry obtained was poured into an excess of methanol and the precipitated polymer removed by filtration and washed. A molecular weight determination on the chloroform soluble portion of the polymer II showed that it had a molecular weight of approximately 1900 corresponding to an average of 19 repeating units in the polymer.

The results obtained are shown in Table II. The results shown for the first stage are for those results obtained for the heating carried out in the absence of oxygen, whereas the results shown under the second stage are those of the final polymer films obtained after heating the stated weights of the products of the first stage with 5 ml. of trichlorobiphenyl as described in Example 1.

TABLE II

IST STAGE

| Phenoxyphenol | Phenol (wt.) | Wt. of Polymer, g. | Analyses | |
|---|---|---|---|---|
| | | | C | H |
| 4-phenoxyphenol | Phenol (3.2) | (I) 3.8 | 76.2 (77.8) | 4.3 (4.3) |
| 4-(4-hydroxyphenoxy) phenol. | Hydroquinone (4.2) | (II) 4.9 | 75.7 (77.8) | 4.2 (4.3) |

2ND STAGE

| | | | | |
|---|---|---|---|---|
| I (2 g.) | | 2.0 | [1] 71.7 | [1] 3.5 |
| II (2 g.) | | 1.9 | 76.0 | 4.0 |

[1] Indicates some residual solvent.

As illustrated above, the polymers obtained by heating in a substantially oxygen-free atmosphere may be used for making films on a substrate from which they may be removed or they may be used to produce protective coatings for the substrate. They likewise may be used to coat, for example, aluminum wire by dipping the wire into the hot solution which is thereafter passed through a heated chamber to convert the coating to the final insoluble, flexible coating on the aluminum wire.

The products may also be esterified with monobasic or dibasic acids, anhydrides, or acyl halides to produce esters which are useful as plasticizers for the general class of polyphenylene ethers as more fully disclosed and claimed in the Gowan application, Ser. No. 528,779, filed Feb. 29, 1966 and assigned to the same assignee as the present invention.

The solutions of the starting phenoxyphenols or the solution of the polymers obtained by heating in a substantially oxygen-free atmosphere may be spread on a continuous casting surface and thereafter passed through a heated oven to convert them to a continuous film of the insoluble, flexible polymer which is stripped from the casting surface. These films can be fabricated into tapes and thereafter coated with a magnetic film to be used as sound recording tapes or be coated with photographic emulsions to be used as photographic films. These films may also be used as slot wedges in the armature of an electric motor or as a dielectric insulation.

The hot solutions of the polymers obtained by heating in an essentially oxygen-free atmosphere may be mixed with various fillers, modifying agents, etc., such as the fillers, stabilizers, plasticizers, etc., and thereafter heated to the insoluble fusible state. They also can be used as encapsulation material, for electrical insulations, potting compounds, etc.

Obviously, other modifications and variations of the present invention are possible in light of the above teachings. It is therefore to be understood that changes may be made in the particular embodiments of the invention described which are within the full intended scope of the invention as defined by the appended claims.

What I claim as new and desire to secure by Letters Patent of the United States is:

1. The process of making polyphenylene ether which comprises heating in the liquid phase, a 4-phenoxyphenol having the formula

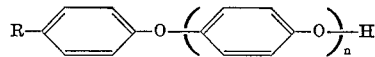

where $n$ is an integer and is at least 1 and not more than 2 and R is a monovalent substituent selected from the group consisting of hydrogen, hydroxyl, methoxy and 4-hydroxyphenoxy to a temperature sufficiently high that the monocyclic phenol corresponding to the terminal phenoxy group of the starting 4-phenoxyphenol and having the formula

where R is as defined above, is distilled from the reaction mixture.

2. The process of claim 1 wherein R is hydrogen.
3. The process of claim 1 wherein R is hydroxyl.
4. The process of claim 1 wherein R is methoxy.
5. The process of claim 1 wherein R is 4-hydroxyphenoxy.
6. The process of claim 1 wherein the liquid phase is obtained by use of a solvent for the 4-phenoxyphenol selected from the group consisting of terphenyl, chlorinated biphenyl and chlorinated diphenyl ether, the temperature of heating is in the range of 300° C. up to the boiling point of the solution and a substantially oxygen-free atmosphere is maintained above the liquid phase during the heating step.
7. The process of producing a flexible film of polyphenylene ether which comprises the process of claim 1 wherein, at least during the last part of the heating, the liquid phase is a thin layer on a casting surface and the heating is carried out in an oxygen-containing atmosphere while the polymeric product is maintained above its initial melting point but below the temperature at which it chars until the melt is no longer mobile.

No references cited.

WILLIAM H. SHORT, Primary Examiner.

M. GOLDSTEIN, Assistant Examiner.